(12) United States Patent
Gray et al.

(10) Patent No.: US 6,907,336 B2
(45) Date of Patent: Jun. 14, 2005

(54) METHOD AND SYSTEM FOR EFFICIENTLY TRAVERSING AN AREA WITH A WORK VEHICLE

(75) Inventors: Sarah Ann Gray, Providence, UT (US); Shane Lynn Hansen, Smithfield, UT (US); Nicholas Simon Flann, Smithfield, UT (US)

(73) Assignee: Deere & Company, Moline, IL (US)

( * ) Notice: Subject to any disclaimer, the term of this patent is extended or adjusted under 35 U.S.C. 154(b) by 44 days.

(21) Appl. No.: 10/445,549

(22) Filed: May 27, 2003

(65) Prior Publication Data

US 2004/0193348 A1 Sep. 30, 2004

Related U.S. Application Data

(63) Continuation-in-part of application No. 10/403,681, filed on Mar. 31, 2003.

(51) Int. Cl.[7] .................................................. G06F 7/00
(52) U.S. Cl. ............................ 701/50; 701/23; 701/25; 701/202; 701/209; 56/10.2 A; 172/2
(58) Field of Search ............................. 701/23, 25, 26, 701/50, 202, 209; 56/10.2 A; 172/2

(56) References Cited

U.S. PATENT DOCUMENTS

| | | | | |
|---|---|---|---|---|
| 4,149,359 A | * | 4/1979 | van der Lely | 56/13.6 |
| 5,334,987 A | * | 8/1994 | Teach | 701/214 |
| 5,528,888 A | * | 6/1996 | Miyamoto et al. | 56/10.2 F |
| 5,648,901 A | | 7/1997 | Gudat et al. | 364/424.027 |
| 5,684,476 A | | 11/1997 | Anderson | 340/988 |
| 5,751,576 A | * | 5/1998 | Monson | 700/83 |
| 5,955,973 A | | 9/1999 | Anderson | 340/988 |
| 5,974,347 A | | 10/1999 | Nelson | 701/22 |
| 5,978,723 A | | 11/1999 | Hale et al. | 701/50 |
| 6,070,402 A | * | 6/2000 | Korthuis et al. | 56/330 |
| 6,088,644 A | * | 7/2000 | Brandt et al. | 701/50 |
| 6,141,614 A | * | 10/2000 | Janzen et al. | 701/50 |
| 6,236,924 B1 | | 5/2001 | Motz et al. | 701/50 |
| 6,336,051 B1 | * | 1/2002 | Pangels et al. | 700/50 |
| 6,385,515 B1 | | 5/2002 | Dickson et al. | 701/28 |
| 6,445,983 B1 | | 9/2002 | Dickson et al. | 701/23 |

OTHER PUBLICATIONS

Makino et al., "Development of a Motion Planning System for an Agricultural Mobile Robot", SICE Jul. 1999, pp. 959–962.*

(Continued)

*Primary Examiner*—Thomas G. Black
*Assistant Examiner*—Eric M. Gibson

(57) ABSTRACT

A border of a designated area is defined within a work area. A designated axis is determined for the designated area. A series of generally parallel rows are aligned consistent with a travel axis having a known alignment with respect to the designated axis. One of the generally parallel rows is aligned as a starting row. The vehicle is pointed in a starting direction along or generally parallel to the travel axis. The vehicle engages in a turn path segment after an end of the starting row to move the vehicle at least somewhat perpendicular to the travel axis between the starting row and a next row. A turn path segment has a turn radius greater than or equal to a minimum turning radius of the vehicle, where the starting row and the next row are spatially separated by a multiple of effective vehicular implement widths less an overlap allowance. The turn path segment is defined so as to skip one or more intervening parallel rows between the starting row and the next row.

28 Claims, 8 Drawing Sheets

OTHER PUBLICATIONS

Gray, Sarah A., Planning and Replanning Events for Autonomous Orchard Tractors [online], 2001 [retrieved on Mar. 17, 2003]. Retrieved from the Internet:<URL: http://www.autonomoussolutions.com/press.html>.

Gunderson, R. W., Torrie, M. W., Flann, N. S., Neale, C. M. U., Baker, D. J., GIS and the Computer–Controlled Farm [online], Jul. 2000. Retrieved from the Internet <URL: http://www.autonomoussolutions.com/press.html>.

Gray, Sarah, Hansen, Shane, and Flann, Nick, Dynamic Replanning for Multiple Unmanned Ground Vehicles Using the Jaugs Architecture [online], Aug. 17, 2002 [retrieved on Mar. 17, 2003]. Retrieved from the Internet <URL: http://www.autonomoussolutions.com/press.html.

Gray, Sarah, What is Path Planning [online], Aug. 17, 2002 [retrieved on Mar. 17, 2003]. Retrieved from the Internet <URL: http://www.autonomoussolutions.com/press.html.

* cited by examiner

METHOD AND SYSTEM FOR EFFICIENTLY TRAVERSING AN AREA WITH A WORK VEHICLE

This application is a continuation-in-part of U.S. application Ser. No. 10/403,681 entitled, A PATH PLANNER AND A METHOD FOR PLANNING A PATH OF A WORK VEHICLE, filed Mar. 31, 2003 (pending), and this application is entitled to the benefit of the foregoing prior application under 35 U.S.C. 120.

FILED OF THE INVENTION

This relates to a method and system for efficiently traversing an area with a work vehicle.

BACKGROUND OF THE INVENTION

An operator of a work vehicle may be exposed to chemicals, fertilizers, herbicides, insecticides, dust, allergens, exhaust fumes, environmental conditions, slopes, low-hanging branches, and other hazards or conditions that might be harmful or irritating to the operator. Further, an operator may not be able to achieve precise row alignment of adjacent rows because of the limited perspective of a human operator from a work vehicle or other factors. The misalignment of rows may lead to excessive or inconsistent row overlap between adjacent rows. In turn, excessive or inconsistent overlap may lead to one or more of the following: wasted fuel, wasted disbursed materials, unharvested crop, and poor aesthetic appearance of the mowed area or processed vegetation. Thus, a need exists for supporting the planning and executing of a precise path of a work vehicle to facilitate manned operation, unmanned operation, or both, of the work vehicle for mowing, harvesting, distributing fertilizer, distributing herbicides, performing agricultural work or performing other work operations.

SUMMARY OF THE INVENTION

In accordance with one embodiment of the invention, a border of a designated area is defined within a work area. A designated axis is determined for the designated area. A series of generally parallel rows are aligned consistent with a travel axis having a known alignment with respect to the designated axis. One of the generally parallel rows is defined as a starting row. In the starting row, the vehicle is pointed in a starting direction along, or generally parallel to, the travel axis. The vehicle engages in a turn path segment after an end of the starting row to move the vehicle at least somewhat perpendicular to the travel axis between the starting row and a next row. A turn path segment has a turn radius greater than or equal to a minimum turning radius of the vehicle, where the starting row and the next row are spatially separated by a multiple of effective vehicular implement widths less an overlap allowance. The turn path segment is defined so as to skip one or more intervening parallel rows between the starting row and the next row.

DETAILED OF THE PREFERRED EMBODIMENT

A mapped area means a work area with boundaries that are mapped or otherwise defined. A designated area may refer to any portion of the work area or the entire work area. The designated area may mean a map object. A map object refers to a desired portion of the mapped area to be mowed, sprayed, harvested, treated, covered, processed or otherwise traversed to accomplish a task. The boundaries of the mapped area and the boundaries map object may be defined to be coextensive with each other, partially contiguous with each other or noncontiguous with each other.

Figure 1:
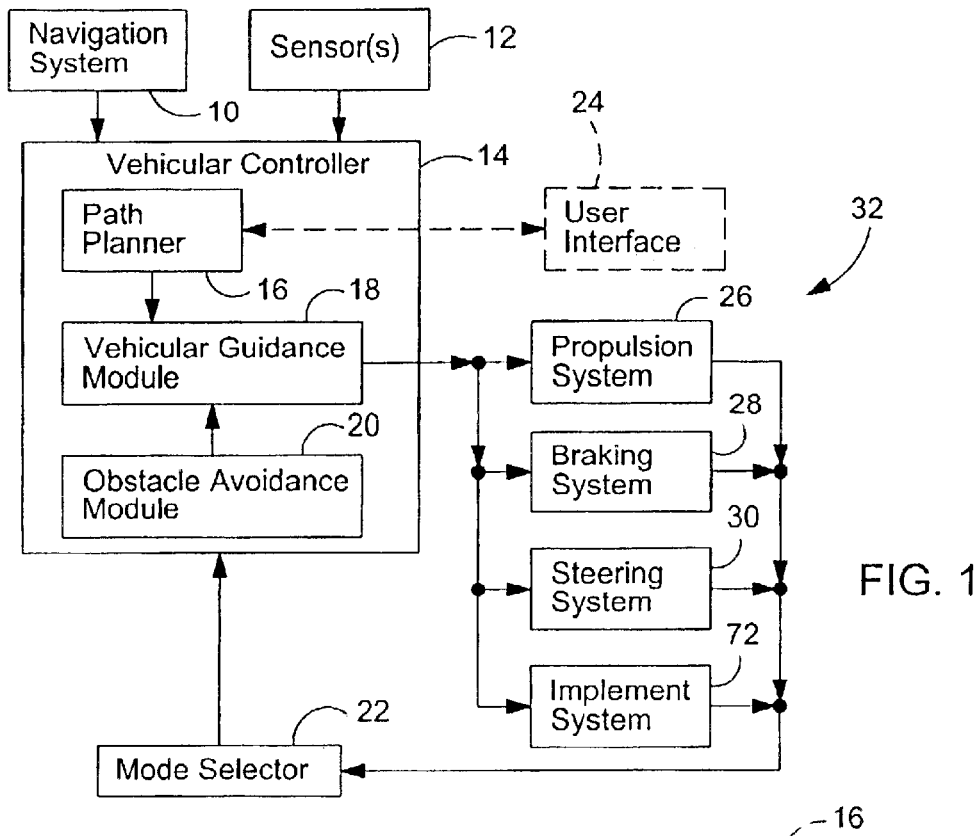
FIG. 1 is a block diagram of a vehicular control system that may support planning and execution of a vehicular path associated with efficiently traversing an area in accordance with the invention.

In accordance with one embodiment of the invention, FIG. 1 shows a block diagram of a system for controlling a vehicle, such as a mower, a stadium mower or another work vehicle. A vehicular controller 14 is coupled to a navigation system 10 and one or more sensors 12. The vehicular controller 14 is associated with a mode selector 22 for selection of one or more modes of operation of the vehicle. The vehicular controller 14 may communicate with a propulsion system 26, a braking system 28 or a steering system 30 and/or an implement system 72.

The navigation system 10 obtains location data (e.g., geographic position or geographic coordinates) of the vehicle with respect to a work area for the vehicle. The navigation system 10 may comprise a Global Positioning System (GPS) receiver with differential correction, a laser navigation system that interacts with several active transmitting beacons or passive reflective beacons at corresponding known, fixed locations or a radio frequency navigation system that interacts with several active transmitting beacons or passive reflective beacons at corresponding known fixed locations. A vehicle-mounted receiver of the laser navigation system or radio frequency navigation system may determine the time of arrival, the angle of arrival, or both, of electromagnetic signals (e.g., optical, infra-red or radio frequency) propagating from three or more beacons to determine location data for the vehicle as the vehicle moves throughout the mapped area or work area. The navigation system 10 provides location data of the vehicle with respect to a reference location or in terms of absolute coordinates with a desired degree of accuracy (e.g., a tolerance within a range of plus or minus 2 centimeters to plus or minus 10 centimeters from the actual true location of the vehicle).

In one embodiment, the vehicular controller 14 comprises a path planner 16, a vehicular guidance module 18, and an obstacle detection/avoidance module 20. The path planner 16 is capable of planning a path of a vehicle based on input data, operator input, or both, via a user interface 24. The user interface 24 may comprise one or more of the following: a keypad, a keyboard, a display, a pointing device (e.g., a mouse), and a graphical user interface. The user interface 24 is shown in dashed lines to indicate that it is optional and may be disconnected from the path planner 16 or vehicular controller 14 during normal operation of the vehicle once the preferential path plan is established or input data is provided to the path planner 16.

The vehicular guidance module 18 guides the vehicle based on the planned path established by the path planner 16 or otherwise provided if an operator or user authorizes or activates the vehicular guidance module 18 to control operation of the vehicle. In one embodiment, the vehicular guidance module 18 facilitates operation of the vehicle in compliance with one or more suitable modes of operation. The vehicular guidance module 18 may control or provide control signals to at least one of a propulsion system 26, a braking system 28, a steering system 30, and an implement system 72 of the vehicle generally consistent with the path plan (e.g., preferential path plan) of the path planner 16, navigation input from the navigation system 10, and sensor input from one or more sensors 12, unless the path plan is overridden by the operator, by the vehicular controller 14, by the obstacle detection/avoidance module 20 by the mode selector 22 or by another control agent of the vehicle. For example, the vehicular guidance module 18 may receive input from the obstacle detection/avoidance module 20 that results in the vehicular guidance module 18, the obstacle detection/avoidance module 20, or both, controlling to at least one of a propulsion system 26, a braking system 28, a steering system 30, and an implement system 72 to avoid striking an obstacle or to avoid intruding into a predetermined no-entry or safety zone around the obstacle.

One or more sensors 12 are used for detecting one or more of the following items: (1) the presence of defined or undefined physical structures through pattern recognition or otherwise, (2) the boundaries of the work area or mapped area and/or map object or designated area through optical or tactile sensing, (3) the presence of an obstacle that obstructs the planned path of the vehicle through ultrasonic sensors or otherwise, (4) the presence of one or more persons or animals, and (5) environmental conditions associated with the vehicle or its operation if the vehicle is operating an autonomous mode or a semi-autonomous mode. Environmental conditions may include data on temperature, tilt, attitude, elevation, relative humidity, light level or other parameters.

In one embodiment, the mode selector 22 supports the selection of at least one of a first mode, a second mode, and a third mode based upon the operator input. For example, the first mode comprises an automatic steering mode, the second mode comprises a manual operator-driven mode, and the third mode comprises an autonomous mode. In a first mode, the vehicular guidance module 18 may control at least one of the propulsion system 26, braking system 28, steering system 30, and the implement system 72, while also allowing an operator to over-ride the automatic control of the vehicle provided by the vehicular guidance module 18 at any time during operation of the vehicle. Accordingly, if an operator interacts or commands at least one of the propulsion system 26, the braking system 28, the steering system 30, and the implement system 72 during the first mode, the mode selector 22 may automatically switch from the first mode to the second mode to allow the operator virtually instantaneous control over the vehicle. In a second mode, an operator of the vehicle commands or activates at least one of a propulsion system 26, a braking system 28, a steering system 30, and an implement system 72 of the vehicle. In a third mode, the vehicular guidance module 18 is adapted to guide the vehicle based upon the planned path and the detection of the presence of an obstacle in the work area. Although the vehicle may have three modes of operation as explained herein, in an alternate embodiment, the vehicle may have any number of modes, including at least one autonomous or semi-autonomous mode. An autonomous mode is where the vehicle has sensors 12 and a control system that allow the vehicle to complete a predefined mission and to deviate from the mission to provide for safety compliance and acceptable interaction with the environment around the vehicle.

The vehicle may be guided over a border of a designated area to trace an outline of the border. The border may be stored in terms of a series of reference geographic coordinates. The navigation system 10 tracks the operational vehicular coordinates and direction of vehicular movement during operation of the vehicle for comparison to the reference geographic coordinates. The vehicular controller 14, the implement system 72, or both, may control the operation of an implement based on the operational vehicular coordinates, the direction of vehicular movement, and the reference geographic coordinates. The implement is selected from the group consisting of a cutting blade, a mowing blade, a mower, a reel mower, a rotary mower, a plow, a harrow, a cutter, a thresher, a mowing deck, a harvester, a pump, a sprayer, an implement for an agricultural machine, an attachment for an agricultural machine, an implement for a tractor, an implement for a construction machine, and an attachment for a construction machine.

Figure 2:
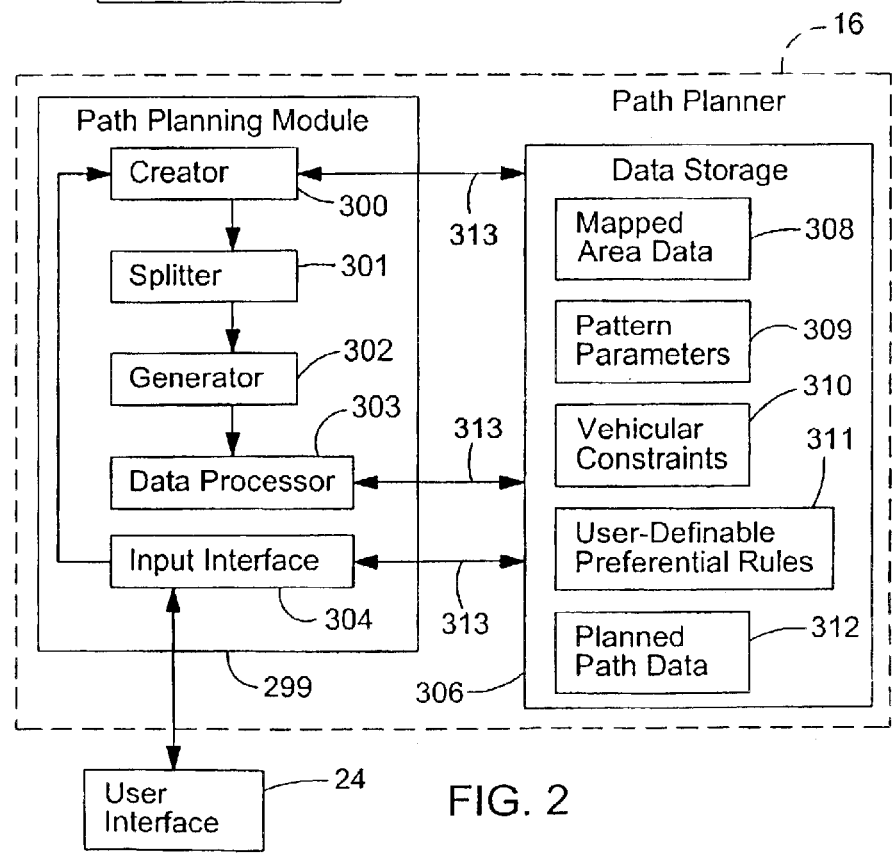
FIG. 2 is a block diagram that shows one possible illustrative embodiment of a path planner in accordance with the invention.

FIG. 2 shows an illustrative embodiment of a path planner 16 in greater detail than FIG. 1. The path planner 16 comprises a path planning module 299 that communicates with data storage 306 via one or more data paths 313. The data paths 313 of FIG. 2 may represent logical data paths, physical data paths, or both.

The path planning module 299 may comprise an input interface 304 that supports the user interface 24 so that a user (e.g., operator of a vehicle) may enter or input data associated with path planning to establish a desired path plan or planned path data 312. In one embodiment, the path planning module 299 further comprises a creator 300 for receiving data from the input interface 304. The creator 300 may communicate with a splitter 301. In turn, the splitter 301 may communicate with a generator 302. The generator 302 may communicate with a data processor 303.

The creator 300 is adapted to create a travel row transparency over a mapped area. The mapped area may represent the work area of a vehicle. For example, the mapped area may include a desired portion or map object to be covered, treated, harvested, sprayed, mowed or otherwise processed by the vehicle or an implement thereof. The creator may obtain a definition of the mapped area from the data storage 306, a user interface 24, or both. The splitter 301 splits or divides the travel rows into travel row sections defined by intersecting the travel row with a map object or boundary.

The generator 302 generates partition nodes based upon the travel row sections. In one embodiment, each partition node is associated with a node identifier that may be assigned to distinguish one partition node from another.

The data processor 303 determines an efficient order or sequence of the partition nodes based upon the mapped area data 308, defined pattern parameters 309, established vehicular constraints 310, and established user-definable preferential rules 311, which may be obtained from accessing the data storage 306. Further, the data processor 303 generates or supports generation of a planned path by looping through the ordered partition nodes or drivable path portions (e.g., edges) interconnecting the partition nodes in the determined efficient order. Once the data processor 303 generates a planned path (e.g., a preferential planned path), the planned path data associated therewith may be stored in the data storage 306 for future reference by the path planner 16.

Figure 3:
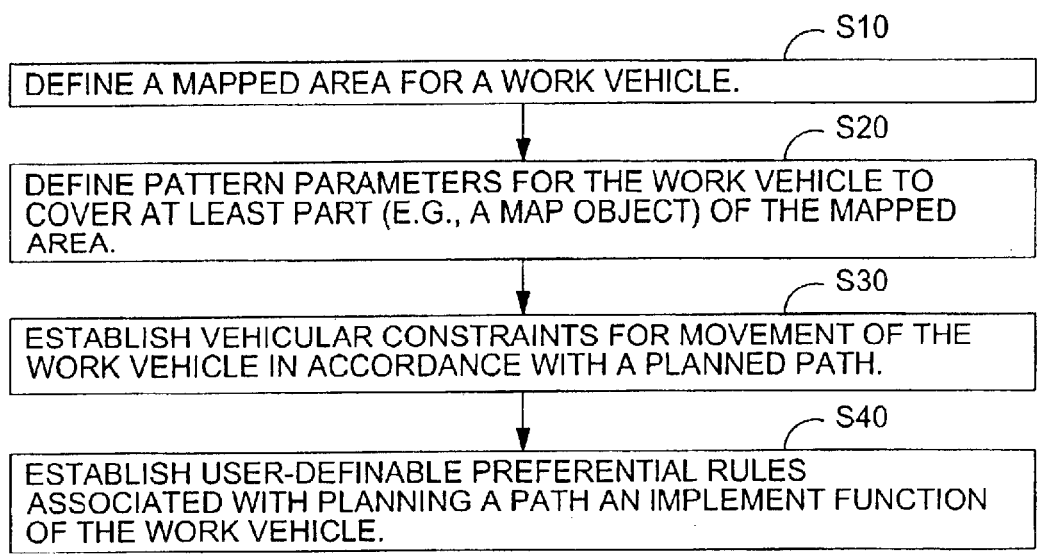
FIG. 3 is a flow chart of a method for establishing a framework of input data for path planning.

FIG. 3 shows a method for gathering input data for planning a path of a work vehicle. The method of FIG. 3 begins in step S10.

In step S10, a mapped area is defined for a work vehicle. In one example, the mapped area includes a green of a golf course. The boundaries of the golf course or any portion of the golf course (e.g., a green of the golf course) may be defined by coordinates. For example, the mapped area may be defined by traversing a boundary of the mapped area or a boundary of a map object within the mapped area with a navigation system 10 of the vehicle and recording location data for the boundary or perimeter of the mapped area, the map object, or both.

In step S20, pattern parameters are defined for the work vehicle to cover at least part (e.g., map object) of the mapped area. The pattern parameters may represent a desired pattern or pattern contribution comprising one or more of the following: a pattern shape, pattern velocity, and pattern directional constraints. Pattern shapes may include any of the following shapes: generally spiral, generally contour, generally linear, generally boustrophedon and back-and-forth straight sweep. Boustrophedon refers to a movement pattern in which the vehicle moves in opposite directions in adjacent rows that are generally parallel to one another. The desired velocity may include the desired velocity on the straight segments, the desired velocity on curved (e.g., semi-circular or circular) segments of the path, or both.

Pattern parameters for the travel path of the vehicle include one or more of the following: (1) whether or not alternate vehicular directions for adjacent parallel rows are permitted, (2) whether or not the same vehicular directions for adjacent parallel rows are permitted, (3) whether or not to stripe the grass, turf or vegetation in a mapped area or a portion thereof by alternating the vehicular direction for adjacent groups, where each group includes two or more adjacent parallel rows mowed in the same direction, (4) whether or not to complete a back and forth straight sweep in conformance with a particular row direction and target line, (5) whether to complete a contour path in conformance with a target contour, (6) under what circumstances is crossing of a previous path permitted by the vehicle (e.g., must the implement system or mowing blades be stopped or deactivated where the vehicle is a mower), (7) what degree of overlap is required for adjacent sweeps or rows for mowing grass or vegetation, and (8) whether the vehicular path can deviate from a continuous loop.

In step S30, vehicular constraints are established. The vehicular constraints pertain to the limitations or capabilities for movement of the work vehicle in accordance with planned path. The vehicular constraints may comprise a vehicular width, a minimum turning radius, an initial vehicular position, an initial vehicular heading, and other specifications of the vehicle or an implement associated therewith. The vehicular constraints may also include the weight of the vehicle, the fuel consumption of the vehicle, the horsepower of the vehicle, the maximum speed of the vehicle, the minimum speed of the vehicle or other considerations.

In step S40, one or more user-definable preferential rules are established. The user-definable preferential rules are associated with planning of a path and implementing of at least one function of a work vehicle. The user-definable preferential rules may pertain to the mapped area, another work area, vehicular characteristics, implement characteristics or other factors related to the vehicle, the mapped area or operator preferences. The user-definable preferential rules may overlap in subject matter with the pattern parameters, and the user-definable preferential rules or the pattern parameters may govern depending upon the programming of the vehicular controller 14, for example.

Although the work vehicle and the preferential rules may be defined for work vehicles other than mowers and for mapped areas other than golf courses, in one illustrative embodiment, the output of the algorithm is a path that adheres to the following rules associated with a mower and a golf course:

1) The path is drivable by the vehicle (e.g., mower);

2) One or more designated areas of the golf course must be mowed,

3) The mowed area must be striped for visual purposes;

4) No turns are allowed on the grass within the designated area;

5) No mowing is permitted outside of the designated area or work area;

6) Minimal turning is desired;

7) The reels (e.g., of the mower) or other cutting blades must be lifted when leaving the boundaries of each designated area; and 8) The reels (e.g., of the mower) or other cutting blades must be lowered and turned on or rotating when entering each designated area. The data input collected in one or more of steps S10, S20, S30, and S40 may be used as input to the path planner 16 in conjunction with the method of FIG. 4.

Figure 4:
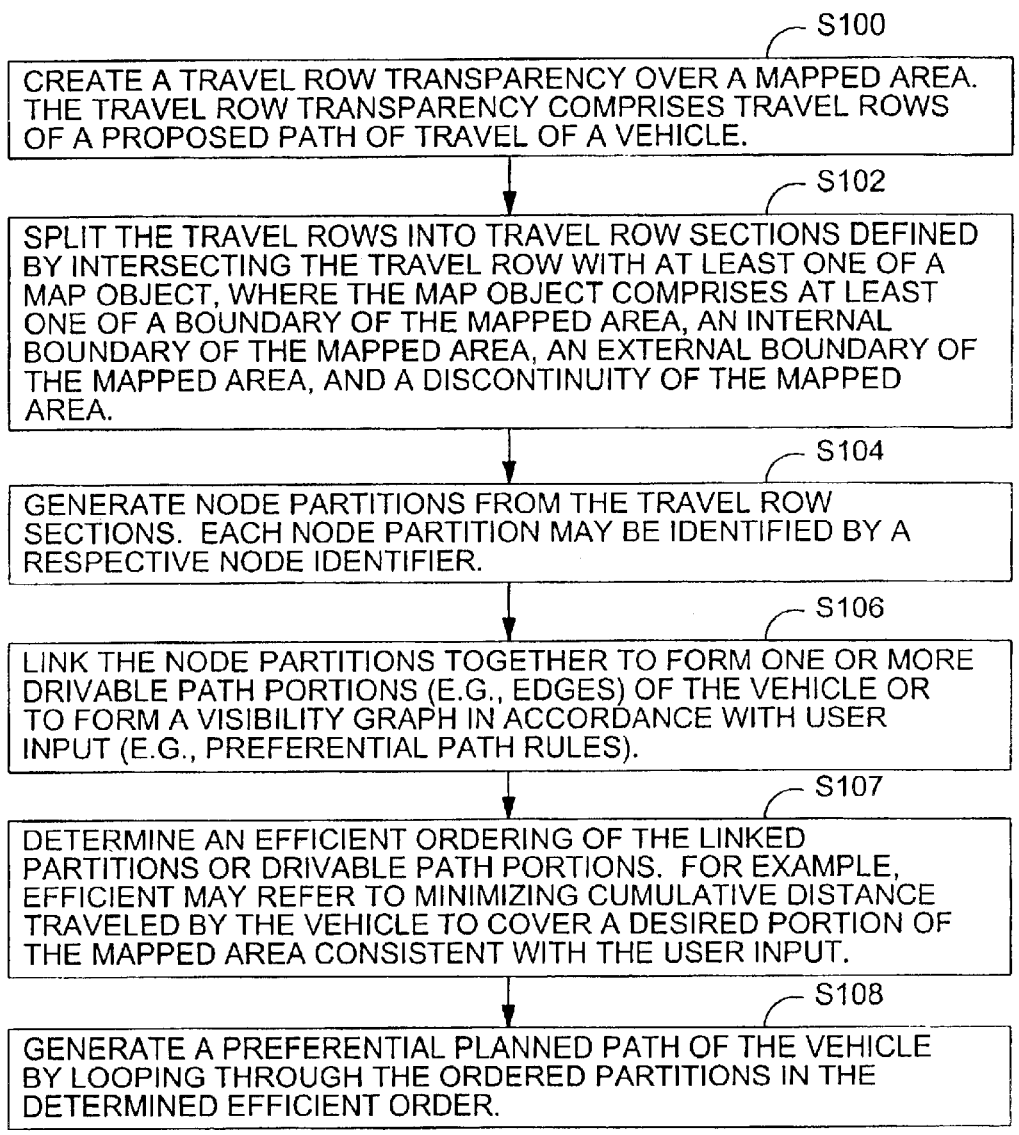
FIG. 4 is a flow chart of a method for path planning that may apply the input data gathered in the method of FIG. 3.

FIG. 4 shows a method of planning a path (e.g., preferential path plan) for a work vehicle, such as a mower. The method of FIG. 4 begins in step S100.

In step S100, the path planner 16 or creator 300 creates a travel row transparency over a mapped area. The travel row transparency comprises one or more travel rows of a proposed travel path of a vehicle. For example, a series of generally straight parallel lines is generated representing travel rows of the vehicle in a specified direction and generally covering the mapped area. Further, step S100 may include defining a target line or designated axis and contouring line segments that make up the target line over the mapped area to produce the transparency. The travel rows of the transparency may extend beyond map objects associated with the mapped area.

In one embodiment, the mapped area or a map object therein may comprise a golf course, a portion of a golf course, a fairway or another area where turf is grown. A green of a golf course may be defined as the map object, the mapped area, or both, by obtaining local coordinates of the green, for example.

In step S102, the path planner 16 or splitter 301 splits the travel rows into travel row sections defined by intersecting the travel row with a map object (e.g., a border of a designated area or a boundary of mapped area) or otherwise forms the travel row sections. The map object comprises at least one of a designated area, a boundary of the mapped area, an internal boundary of the mapped area, an external boundary of the mapped area, and a discontinuity within the mapped area. An external boundary of a mapped area may represent an external perimeter or periphery of the mapped area or work area. An internal boundary of the mapped area may represent an internal perimeter bounding a discontinuous region or restricted region in the mapped area or work area. The vehicle may be prohibited from entering one or more discontinuous or restricted regions, which may be coextensive with obstacles or hazards, for example.

In one example, the splitting of step S102 comprises dividing travel rows of the travel row transparency into travel row sections associated with one or more intersections of a respective travel row with a corresponding map object. A first and an Nth section of a travel row generally extend past the map object, where N equals any odd whole number equal to or greater than three. Each even section of the travel row indicates a section that the vehicle must track starting with the second section on to the Mth section of the travel row, where M=N−1 and where N equals any odd whole number equal to or greater than three and depends upon the geometry of the map object.

In step S104, partition nodes (e.g., primitive partitions) from the travel row sections are generated. A partition node is defined at the intersection or near the adjacent termination points of two travel row sections if (1) a starting point and an end point of the adjacent travel row sections are adjacent to each other, which means there are no intervening travel rows between the two travel row sections, and (2) the starting point and the end points of the adjacent travel row sections lie on the same map object or boundary.

Each partition node may be assigned a unique node identifier to distinguish all nodes from each other. The node identifiers may be selected based on the relative or absolute coordinates or position of the nodes, but may be selected and assigned on any other basis, including selection from a defined set of numbers or alphanumeric characters. Partition nodes may be generated from travel row sections that comply with certain conditions.

In step S106, the partition nodes are linked together by connecting nodes to form drivable path portions, a visibility graph or both, consistent with user input and vehicular constraints. In one embodiment, the linking comprises defining a list of paired partition node identifiers. A drivable path portion links two partition nodes if there is a drivable path that links the two nodes together, subject to other possible conditions. The drivable path portion may represent one or more of the following: an edge, a generally linear path segment, a generally curved path segment, a generally arched path segment, a generally semi-circular path segment, a generally keyhole-shaped segment, and a generally bulb-shaped segment.

In one example of carrying out step S106, the drivable path portions comprise edges. Accordingly, an edge links two partition nodes if a drivable path exists, subject to compliance with other conditions of user input. An edge may be identified by a unique edge identifier. The edge identifier may be associated with paired node identifiers, or an edge identifier may be assigned in accordance with other techniques. In one embodiment, the edge may be susceptible to pattern parameters, user-definable preferential rules or both. For example, the edge may be prohibited from crossing the designated area on a diagonal path to connect two partition nodes across another edge, even if a drivable path otherwise exists between two partition nodes.

The path planner 16 or data processor 303 uses a graph-based approach, which may be expressed as graphical, tabular or mathematical representations. A graph is made up of nodes and edges. Nodes are "choice points" in the graph; and edges connect the nodes together. The visibility graph is the graph of nodes and edges that represents many or all of the possible solutions for a preferential path of the vehicle that covers the mapped area or a desired portion thereof, consistent with user input (e.g., user input of FIG. 3).

In step S107, an efficient ordering of the partition nodes or drivable path portions (e.g., edges) are determined consistent with the user input. The ordered partition nodes may be defined by a sequential list or ranking of partition nodes or corresponding partition nodes identifiers. Similarly, the sequence of drivable path portions may be defined by a sequential list or ranking of edges or corresponding edge identifiers. To carry out step S107, for example, a search algorithm associated with the data processor 303 may search through the established visibility graph (e.g., a graphical representation, mathematical representation or another representation of many or all possible solutions) to determine which solution is optimal or preferential to accomplish one or more of the following objectives: (1) to minimize energy expenditure of the vehicle for completion of a work task (e.g., mowing, harvesting, etc.) in the mapped area or work area, (2) to minimize work time for completing a work task in the mapped area or work area, (3) to minimize the total distance of the traveled route of the vehicle to fully cover a desired portion (e.g., the entire portion) of the mapped area without significant overlap of the vehicular route, and (4) to meet another target performance objective for a vehicle performing work or another function in the mapped area. Further, in addition to achieving at least one of the foregoing objectives, the efficient ordering of the partition nodes are determined consistent with one or more of the following user inputs: (a) complying with any applicable user-definable preferential rules, (b) complying with vehicular constraints, (c) complying with any applicable pattern parameters, and (d) complying with applicable boundary conditions associated with the mapped area, as previously described in conjunction with FIG. 3.

Step S107 may be carried out in accordance with several techniques that may be employed cumulatively or in the alternative. In accordance with a first technique, efficient ordering refers to minimizing the cumulative distance traveled by the vehicle to cover a desired portion of the mapped area or work area consistent with the user input. In accordance with a second technique, the efficient ordering is determined based on minimizing or reducing the energy consumption of the vehicle to complete a work task in the mapped area or work area. Accordingly, a respective energy expenditure or rating may be associated with each partition node solution or a statistically viable solution set of the visibility path to determine the optimal solution for ordering of the partition nodes. For instance, the determining comprises using a bounded search algorithm to determine an efficient order of the partition nodes, where a search is used to identify preferential solution compliant with an efficiency objective for covering of a mapped area. In accordance with a third technique, the efficient ordering is determined based on adherence to a set of path rules, including that a path is drivable by the vehicle based on vehicular constraints, including at least vehicle width, minimum vehicular turning radius, initial vehicular position, and initial vehicular heading. In accordance with a fourth technique, the efficient ordering is determined based on adherence to a set of path rules, including compliance with a user-definable pattern parameter selected from the group consisting of traversing adjacent travel rows in opposite directions, traversing intra-group rows of travel rows in the same direction and inter-group travel rows in opposite directions, back-and-forth straight sweep of the travel rows, row direction rules, parallel tracking of target contour, and parallel tracking of a target line.

In step S108, the path planner 16 generates a preferential path by looping through the ordered partition nodes or the sequential edges in the determined efficient order, which was determined in step S107. The preferential path may include planned path data 312 that is stored in data storage 306 for later reference by the vehicular guidance module 18 or other components of the vehicular controller 14. In one embodiment, the path planner 16 generates the preferential path of the vehicle by looping through at least one of the following: (1) the ordered partition nodes, (2) ordered pairs of partition nodes or (3) a sequence of edges that were established pursuant to step S107. The partition nodes or the edges may be interconnected by curved vehicular travel path segments that fall outside of the map object or outside of a desired portion to be covered or treated within the mapped area. The curved vehicular travel path segments have curve radii or curve diameters that are consistent with the vehicular constraints of the vehicle. Each subsequent partition node is connected the next successive partition node via a drivable path portion (e.g., an edge or a curved vehicular path segment), as required for compliance with the user input, and so forth, until the last partition node has been processed.

Figure 5:
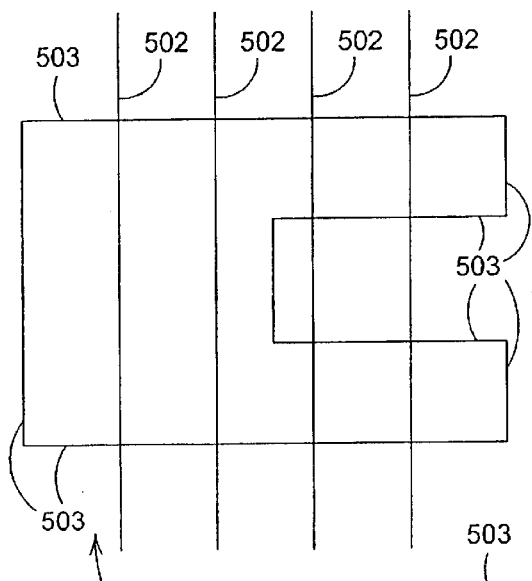
FIG. 5 represents an example of a travel row transparency, consistent with the method of FIG. 4.

FIG. 5 represents an example of a travel row transparency 500, consistent with the method of FIG. 4. The method of FIG. 4 may create the illustrative travel row transparency 500 of FIG. 5 or another travel row transparency, pursuant to step S100 of FIG. 4, for example. The travel row transparency 500 comprises a map object 501 and a series of generally parallel travel rows 502 superimposed over the map object 501 in a mapped area. Although the map object 501 has a generally polygonal shape with generally straight rectilinear boundaries 503, in alternate embodiment, the map object may have virtually any shape. As shown, four illustrative travel rows 502 are parallel to each other and extend beyond the map object 501.

Figure 6:
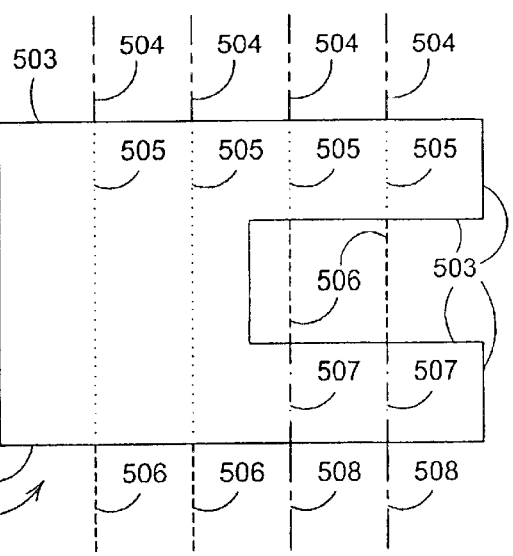
FIG. 6 represents illustrative travel row sections, consistent with the method of FIG. 4.

FIG. 6 represents illustrative travel row sections, consistent with the method of FIG. 4. The method of FIG. 4 may form the illustrative travel row sections (504, 505, 506, 507, and 508) of FIG. 6 or other travel row sections, pursuant to step S102 of FIG. 4, for example. As shown in FIG. 6, each of the two leftmost travel rows comprises three travel row sections (labeled 504, 505, 506), whereas the two rightmost travel rows comprise five travel row sections (labeled 504, 505, 506, 507, and 508). Each travel row section is shown as a unique line pattern in FIG. 6 for clarity. For example, some travel row sections 504 are shown as lines, where each line is interrupted by two adjacent short dashes; some travel row sections 505 are shown as dotted lines; other travel row sections 506 are shown as dashed lines; still other travel row sections 507 are shown as alternating dot-dash lines; and still other travel row sections 508 are shown as lines, where each line is interrupted by a single short dash.

Figure 7:
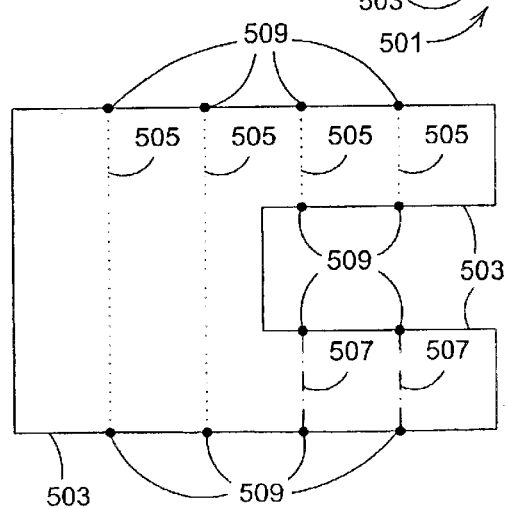
FIG. 7 represents illustrative node partitions, consistent with the method of FIG. 4.

FIG. 7 represents illustrative node partitions consistent with the method of FIG. 4. The method of FIG. 4 may generate node partitions 509 of FIG. 7 or other node partitions, pursuant to step S1 04 of FIG. 4, for example. Each of the node partitions 509 is indicated by a dot that is coextensive with the termination of a travel row section (e.g., 505 or 507) and the boundary 503 of the map object 501. The straight or generally linear travel row sections (e.g., 505 and 507) that interconnect the partition nodes 509 are designated as edges throughout this document. The node partitions 509 together with the edges represent one possible visibility graph 510, although other visibility graphs may be formed in accordance with the invention and fall within the scope of the claims.

Figure 8:
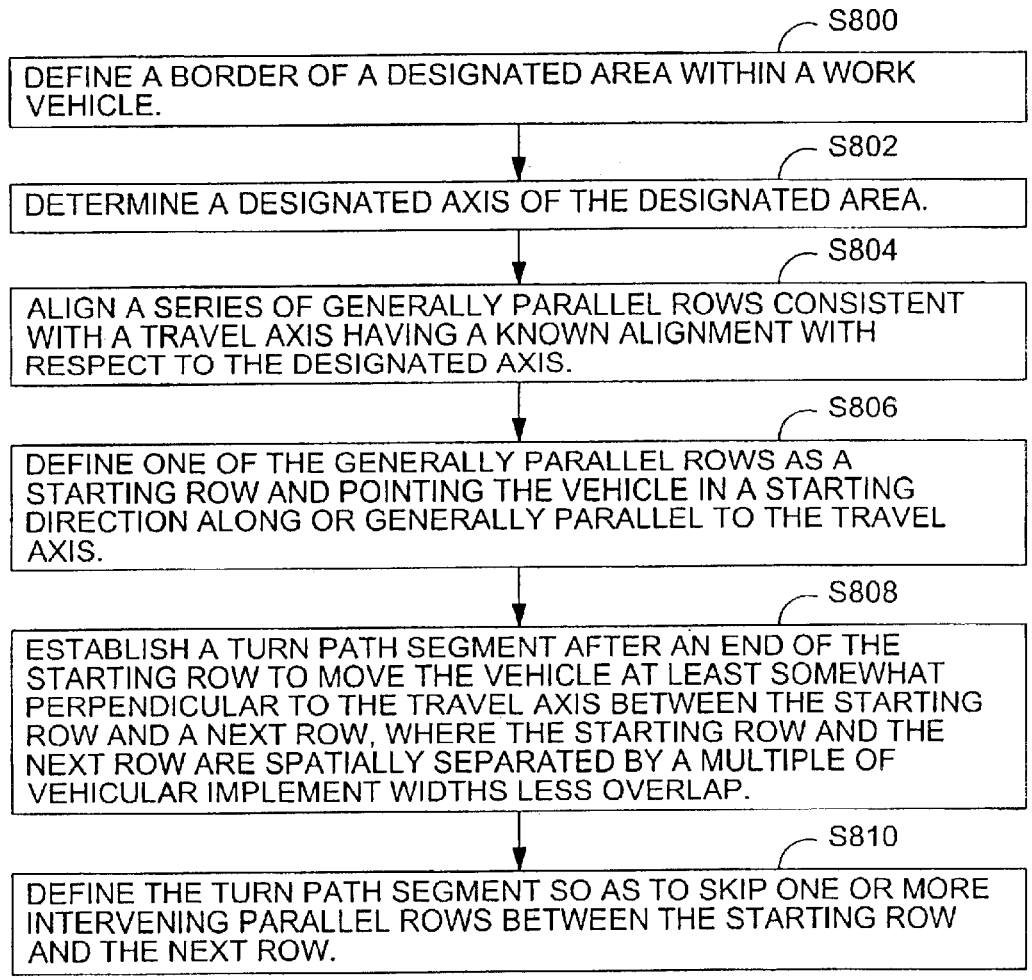
FIG. 8 is a method for efficiently traversing an area with a work vehicle in accordance with the invention.

FIG. 8 discloses a method for determining a planned path for a vehicle. The method of FIG. 8 starts in step S800.

Figure 10:
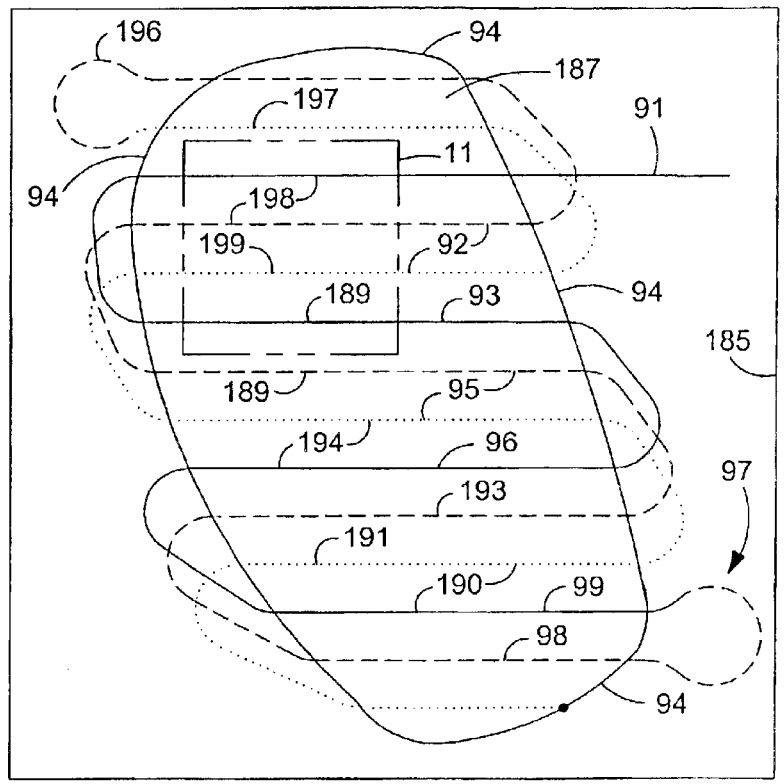
FIG. 10 is an illustrative designated area that is covered by an exemplary preferential planned path of a work vehicle.

In step S800, a navigation system 10 or a path planner 16 of a vehicle facilitates defining a border (e.g., border 94 of FIG. 10) of a designated area (e.g., designated area 187 of FIG. 10). The designated area resides within a work area. The border of the designated area may be stored as mapped area data for storage in the data storage.

In step S802, a user may enter or a path planner 16 may define a designated axis of the designated area. The designated axis may be stored as a pattern parameter 309 for storage in the data storage 306.

In step S804, a path planner 16 determines planned path data 312 based on the pattern parameters 309, where the planned path data 312 includes a series of generally parallel rows aligned consistent with a travel axis. The travel axis associated with the vehicle has a known alignment with respect to the designated axis. Within the designated area, the vehicle may travel consistent with or generally parallel to the travel axis, except for turns, obstacle avoidance maneuvers, job interruptions, or other circumstances.

In step S806, the path planner 16 or a vehicular guidance module 18 defines one of the generally parallel rows as a starting row and provides instructions to point the vehicle in a starting direction along or generally parallel to the travel axis. Consistent with a preferential path plan, the starting row may be defined based on (a) an arbitrary starting point of the vehicle, (b) aligned with some reference point associated with the work area, or (c) a starting point selected by an operator or another facilitator.

In step S808, the path planner 16 or vehicular guidance module 18 establishes a turn path segment after an end of the starting row to move the vehicle at least somewhat perpendicular to the travel axis between the starting row and a next row. The vehicle steering system 30 is responsible for executing the turn path segment. A turn path segment has a turn radius greater than or equal to a minimum turning radius of the vehicle, where the starting row and the next row are spatially separated by a multiple of effective vehicular implement widths less an overlap allowance. Although a multiple of effective vehicular implement widths may represent a non-negative integer multiple of effective vehicular implement widths, the multiple or whole number is preferably any integer or whole number greater than or equal to one. The effective vehicular implement width associated with the vehicle may be defined as one or more of the following: the physical width of the vehicular implement, a measurement of the implement dimension generally perpendicular to the direction of frontward vehicular movement, cutting width, processing width, swath, one or more wheelbase dimensions, one or more track dimensions, and vehicular width. In one embodiment, the overlap allowance refers to a user-definable setting constrained by a cumulative tolerance of the accuracy of a navigation system and steering system of the vehicle.

The preferential path plan of the vehicle may skip one or more rows on in a work area (e.g., an open field) to increase efficiency of the preferential planned path. The skipping of rows facilitates optimization of the efficiency of the preferential path plan and facilitates greater than minimum radius turns to be incorporated into the preferential path plan. In one example, efficiency may be increased by reducing or minimizing the total distance traveled by the work vehicle over the preferential planned path or to substantially cover or service the designated area. In another example, efficiency may be increased by reducing fuel consumption of the vehicle by reducing or shortening the work path or preferential path plan by executing wider turns than would otherwise be executed during manual human operation of the work vehicle. Further, wider turns are executed without sacrificing precise row alignment of adjacent rows that minimizes adjacent row overlap. In yet another example, efficiency may be increased by reducing the overall time duration that would otherwise be required to cover or service a designated area with a manually or humanly steered work vehicle. In still another example, efficiency may be increased by conserving momentum associated with the vehicle transition from linear path segments into curved path segments. In another example, broader than minimum radius turns may be used such that at least one of turn-entry velocity, turn velocity, and turn-exit velocity are increased with respect to a minimum radius turn of the vehicle. In still another example, stress on suspension components of the vehicle is reduced during cornering for broader turns than minimum radius turns of the vehicle.

In step S810, the path planner 16 or the vehicular guidance module 18 defines the turn path segment so as to skip one or more intervening parallel rows between the starting row and the next row. For example, two intervening rows may be skipped between the starting row and the next row.

Following step S810, the method may continue with one or more additional steps or procedures in accordance with various alternate or cumulative techniques. In accordance with a first technique, the path planner 16 or the vehicle guidance module 18 may establish an additional turn path segment after an end of the next row to move the vehicle at least somewhat perpendicular to the travel axis between the next row and a subsequent next row. The additional turn path segment has a turn radius greater than or equal to a minimum turning radius of the vehicle. Further, the additional turn path segment is aligned so as to skip one or more intervening parallel rows between the next row and the subsequent next row. The next row and the subsequent next row are spatially separated by a multiple of effective vehicular implement widths, less one or more overlap allowances for overlap between adjacent rows to provide generally sufficient coverage of the designated area or some other portion of the work area.

In accordance with a second technique following step S810, the method of FIG. 8 may support planning execution of various transition turns to achieve a desired preferential path plan. Under a first procedure, the path planner selects a bulb-shaped turn for at least one turn path segment in the planned path if the bulb-shaped turn substantially supports opposite travel directions for the vehicle for adjacent travel rows throughout the designated area and if a non-bulb-shaped turn for the turn path segment does not substantially support opposite travel directions for the vehicle for adjacent travel rows throughout the designated area. Under a second procedure, the path planner selects a generally keyhole-shaped turn for at least one turn path segment in the planned path if the keyhole-shaped turn substantially supports opposite travel directions for the vehicle for adjacent travel rows throughout the designated area and if a non-keyhole-shaped turn for the turn path segment does not substantially support opposite travel directions for the vehicle for adjacent travel rows throughout the designated area. Under a third procedure, the path planner selects a minimum radius turn for at least one turn path segment to facilitate coverage or traversal of one or more skipped rows within the designated area. Further, the minimum radius turn segment or another appropriately sized turn segment may allow a vehicle to traverse adjacent rows in opposite directions with a desired tolerance of overlap between the adjacent rows. Under a fourth procedure, the path plan determines a treatment of vegetation or soil within at least one of the designated area and the work area. The determined treatment is mowing the vegetation within the designated area.

Figure 9:
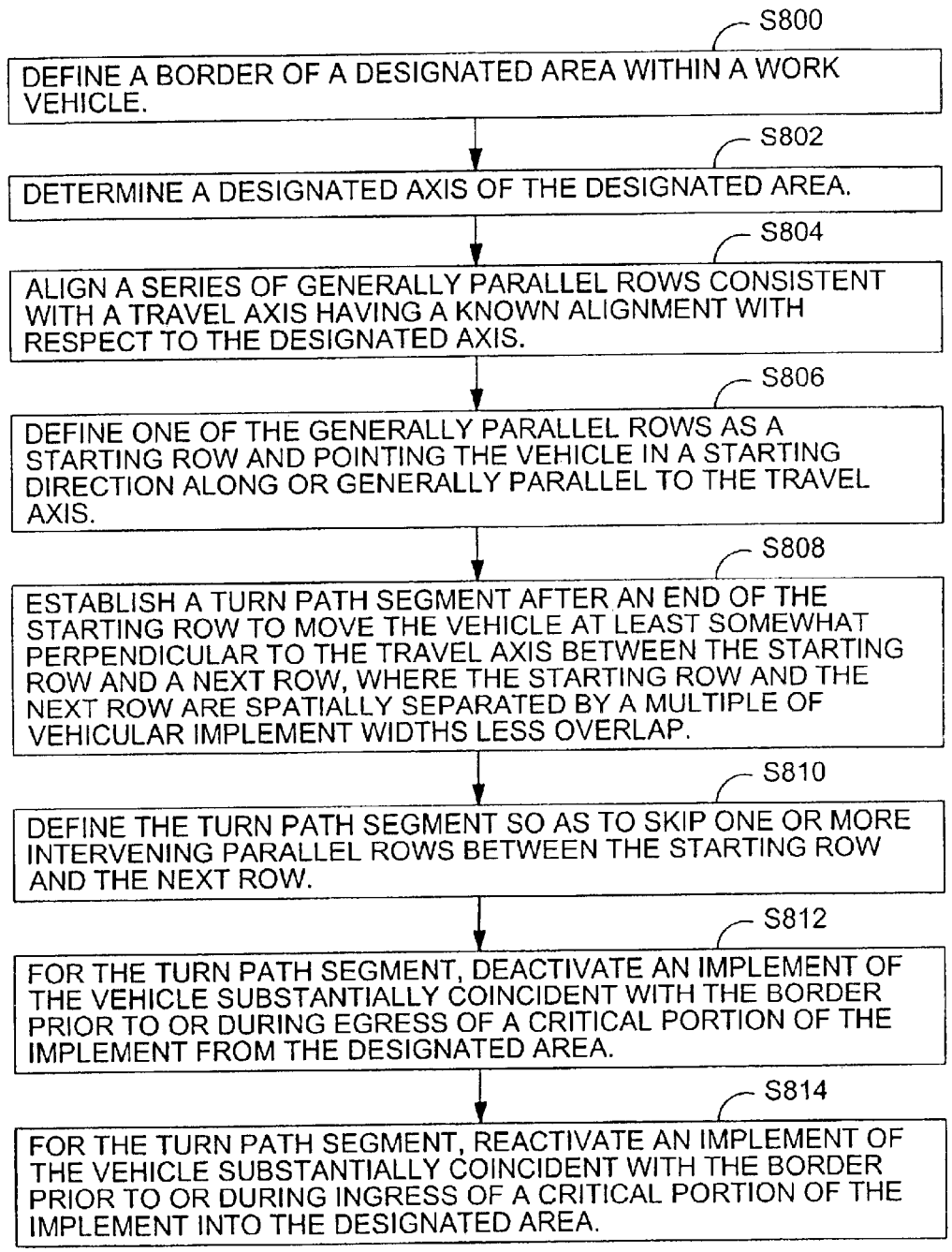
FIG. 9 is an alternate embodiment of a method for efficiently traversing an area with a work vehicle.

FIG. 9 is an alternate embodiment of a method for planning a preferential path or executing a preferential path plan. The method of FIG. 9 is similar to the method of FIG. 8, except the method of FIG. 9 includes additional steps S812 and S814. Like reference numbers in FIG. 8 and FIG. 9 indicate like or substantially similar procedures or steps.

Step S812 is carried out after step S810. In step S812, for the turn path segment, a path planner 16, a vehicular controller 14 or an implement system 72 deactivates an implement of the vehicle substantially coincident with a border of the designated area prior to or during egress of a critical portion of the implement from the designated area. The critical portion may comprise one or more of the following: a cutting blade, a leading edge of a cutting blade, a mowing deck, a leading edge of a mowing deck of a mower, a header, a leading edge of a header of a combine, a leading edge of a corn head of a combine or another implement portion that impacts or contacts at least one of vegetation, the soil, the ground or another environmental feature. The leading edge is the edge or surface generally facing frontward movement of the vehicle. The vehicular controller 14 may compare the instantaneous measured location data (from the navigation system 10) to the stored location data on the border of the designated area to determine when the vehicle is imminently approaching the border, or near or at the border.

In one example of executing step S812, the vehicular controller 14 or the implement system 72 deactivates an implement to establish a mowed contour consistent with the border of the designated area (e.g., a green of a golf course) by deactivating an implement in conformance with the sum of an implement deactivation time duration and a velocity-based time factor associated with the velocity of the vehicle. The implementation deactivation time duration represents a mechanical movement time period plus an electronic control system time period. For example, the mechanical movement time period is the duration it takes the implement or a movable portion thereof to stop, disengage from, or passively interact with, vegetation or soil. The electronic control system time is the time delay that it takes the control system to react to a command or control signal provided by at least one of the navigation system 10, a sensor 12, and a vehicular guidance module 18.

In step S814, for the turn path segment, a path planner 16, a vehicular controller 14 or an implement system 72 reactivates an implement of the vehicle substantially coincident with the border prior to or during ingress of a critical portion of the implement into the designated area. The reactivation may be associated with a return-to-cut of a mower after exiting a turn or a return-to-dig of a loader, dozer, scraper or earth-moving equipment after exiting a turn. In one example, the vehicular controller 14 or the implement system 72 activates an implement to establish a mowed contour consistent with the border by deactivating an implement in conformance with an implement activation time duration and a velocity-based time factor associated with the velocity of the vehicle. The implementation activation time duration represents the sum of a mechanical movement time period plus a electronic control-system time period. For example, the mechanical movement time period is the time it takes the implement or a movable portion thereof to begin moving at an operational movement velocity, operably engage vegetation or soil or otherwise actively interact with vegetation or soil. The electronic control system time period is the time delay that it takes the control system to react to command or control signal provided by at least one of the navigation system 10, a sensor 12, and a vehicular guidance module 18.

Step S814 may be carried out in accordance with various techniques. Under a first technique, the path planner 16 or the vehicular controller 14 may compare the instantaneous measured location data (from the navigation system 10) to the stored location data on the border of the designated area to determine when the vehicle is imminently approaching the border. Under a second technique, the vehicular controller 14 may measure the angular velocity of the vehicle or sense the imminent completion of a turn to determine when the vehicle is imminently approaching the border of the designated area.

FIG. 10 shows an illustrative path plan over a work area 185. The illustrative path plan may be formed in accordance with the method of FIG. 8, FIG. 9 or other methods described herein. A border 94 defines a designated area within the work area 185. In one example, the designated area 187 may comprise a green of a golf course and the vehicle may comprise a mower. The vehicular controller 14 or the path planner 16 activates the implement system 72 (e.g., begins rotation of cutting blade at a desired rotational velocity for cutting and/or lowers a cutting deck of a mower) within the designated area 187 and deactivates the implement system 72 outside of the designated area 187.

The illustrative planned path of FIG. 10 may be divided into three stages. The first phase is indicated by a dotted line. Although the path of FIG. 10 starts in the first phase, executes the second stage, and then progresses through to the third phase in an alternate embodiment the vehicle may begin in the third phase, followed by the second phase, and then the first phase.

During a first phase, the planned path of FIG. 10 begins with a starting row 91. One end of the starting row 91 may be generally coincident with the border. A vehicle may turn at the end of the starting row 91 in a manner that bypasses one or more rows. As illustrated, the vehicle skips two successive rows 92, which allows the vehicle to maintain its momentum exceeding the minimum turning radius of the vehicle. The direction of travel of the vehicle is changed (e.g., reversed) from the starting row 91 to the next successive row 93. One end of the next successive row 93 generally terminates coincident with the border 94. At the end of the next successive row 93, the vehicle may turn in a manner that bypasses one or more successive rows. As illustrated, the vehicle skips two successive rows 95, which allows the vehicle to maintain its momentum and to meet or exceed the minimum turning radius of the vehicle. The direction of the travel of the vehicle is changed (e.g., reversed) from the next successive row to the additional row 96. The foregoing process is repeated until a first transition turn 97 is entered, which marks the transition between the first and second phase.

The second phase includes the planned path after completion of the transition turn. Upon exiting the transition turn into the transition row 98, no row is skipped and there is overlap (e.g., consistent with an overlap allowance) with respect to a previously traversed (e.g., previously mowed) row 99. At the end of the transition row 98 opposite the transition turn 97, the vehicle turns to skip one or more successive rows 190. As shown, one skipped row (e.g., row 99) is previously traversed (e.g., mowed), whereas the adjacent skipped row (e.g., 191) is previously untraversed (e.g., unmowed). At the end of the next row 193, the vehicle may turn in a manner that bypasses one or more successive rows. Again, the vehicle may skip two rows 194, one previously traversed row and one previously untraversed row. The above process of this paragraph is repeated until a second transition turn 196 is reached.

The third phase includes the planned path after completion of a second transition turn 196. Upon exiting the second transition turn 196 within the transition row 197, no row is skipped and there is overlap with respect to a previously traversed (e.g., previously mowed) row. At the end of the transition row 197 opposite the transition turn 196, the vehicle turns to skip one or more successive rows 198. As shown, both skipped rows are previously traversed (e.g., mowed). At the end of the next row 199, the vehicle may turn in a manner that bypasses one or more successive rows. Again, the vehicle may skip two previously traversed rows 189 (e.g., two previously mowed rows). The above process of this paragraph is repeated until the designated area is covered.

As illustrated in FIG. 10, the vehicle may complete one or more turns outside of the designated area 187. Further, the implement may be deactivated during any or all of the turns. Deactivated means inactive or disengaged from the soil or vegetation growing thereon. Conversely, the implement system of the vehicle may be activated when traversing the generally linear rows within the designated area with a predefined amount of overlap between adjacent rows consistent with an overlap allowance. A vehicular controller 14 or the implement system 72 may activate an implement of the vehicle generally coincident with the border 94 upon movement of the vehicle toward an inside the designated area 187. In one example, a combine as the vehicle may execute a return-to-cut procedure to coordinate the incipiency of cutting with the border 94 or immediately prior thereto. In another example, a loader as the vehicle may execute a return-to-dig procedure to coordinate the lowering of an implement platform a portion associated therewith generally coincident with or immediately prior to the border 94. The vehicular controller 14 may deactivate the implement of the vehicle coincident with the border upon movement of the vehicle toward an outside of the designated area 187. It is understood that the navigation system 16 provides location data for aligning the vehicle with the preferential planned path of FIG. 10. The location data facilitates skipping of rows and compliance with a defined overlap allowance between adjacent rows of a preferential path plan of the vehicle.

Figure 11:
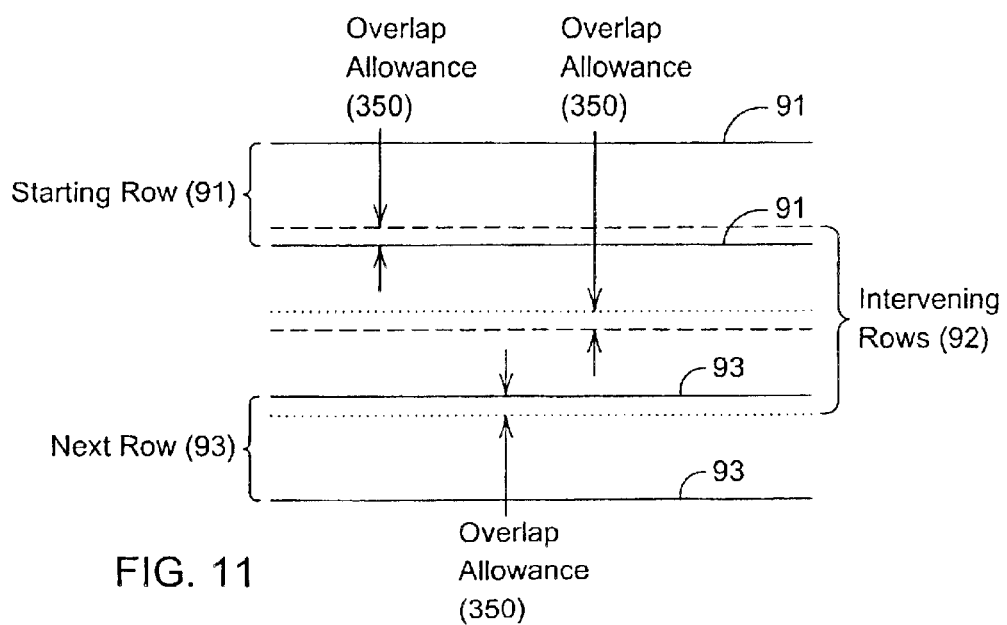
FIG. 11 shows a portion of the preferential path of FIG. 10 within the box 11 composed of dashed lines.

FIG. 11 shows a portion of the preferential path of FIG. 10 within the box 11 composed of dashed lines. Like reference numbers indicate like elements FIG. 10 and FIG. 11.

FIG. 11 shows a portion of the starting row 91 and the next row 93 separated by one or more intervening rows 92. The starting row 91 and the next row 93 may represent rows that are defined in a field or another work area where the row width is defined by a work vehicle or an implement associated therewith. The starting row 91 width is indicated by the left-most solid pair of solid lines, whereas the next row 93 width is indicated by the right-most solid pair of lines. Between the starting row 91 and the next row 93, there are one or more intervening rows 92, which may be referred to as skipped rows or intervening skipped rows. The first intervening skipped row or rows are indicated by a dashed pair of lines. The second intervening skipped row or rows are indicated by a dotted pair of lines.

The starting row 91 and the next row 93 may be offset by one or more effective vehicular implement widths, less an overlap allowance 350 between adjacent rows. Although FIG. 11 shows the starting row 91 and the next row 93 offset by two vehicular vehicle widths, less three overlap allowances 350, the starting row 91 and the next row 93 may be offset generally by Q effective vehicular implement widths, less Q+1 overlap allowances 350, where Q is any positive whole number or integer. The amount of overlap or overlap allowance 350 between adjacent rows may vary with the task performed by the vehicle, an implement thereon or in accordance with other factors. Where chemicals or other crop inputs are being distributed as the task, the overlap may be minimized or may be nominal (e.g., 10 centimeters or less) to conserve distributed material (e.g., fertilizer or chemical treatment). Where aesthetic appearance or uniformity in mowing of vegetation or grass is required, the overlap need not be minimized, greater than nominal overlap (e.g., more than 10 centimeters) may be used. For harvesting operations, the amount of overlap should be sufficient to harvest substantially the entire crop with a desired degree of reliability. The reliability may be expressed in terms of harvesting substantially all rows (e.g., standing rows) of crop greater than or equal to a threshold percentage of reliability (e.g., 99.9 percent of the time). Because of the precise alignment of the starting row 91 and the next row 93, the navigation system 10 may be used to consistently reproduce the pattern.

Figure 12:
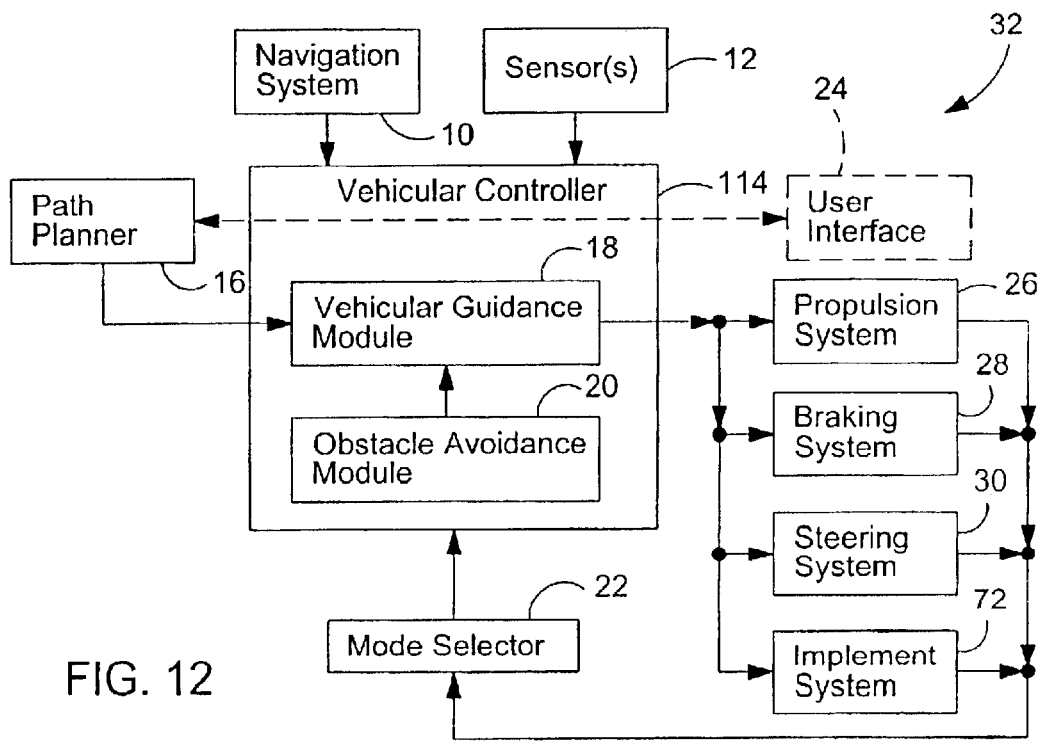
FIG. 12 is a block diagram of an alternate embodiment of a vehicular control system that may incorporate or support a path planning of this invention.

FIG. 12 is a block diagram of a vehicular control system that is similar to that of FIG. 1, except the vehicular controller 114 of FIG. 12 excludes the path planner 16 integrated therein. Rather, the path planner 16 of FIG. 12 is configured separately from the vehicular controller 114, but the path planner 16 and the vehicular controller 114 of FIG. 12 collectively perform the same functions as the vehicular controller 14 and the path planner 16 of FIG. 1. Like reference numbers in FIG. 1 and FIG. 12 indicate like elements.

Work vehicles that safely adhere to a planned path may be used to eliminate or reduce the exposure of a human operator to chemicals, fertilizer, herbicides, insecticides, dust, allergens, exhaust fumes, environmental conditions, slopes, low-hanging branches, and other hazards that might be harmful or irritating to an operator. Further, the planned path of a work vehicle may be completed with precision which equals or exceeds that of a human operator to obtain a desired aesthetic appearance.

Having described the preferred embodiment, it will become apparent that various modifications can be made without departing from the scope of the invention as defined in the accompanying claims.

We claim:

1. A method for determining a planned path for a vehicle, the method comprising:
    defining a border of a designated area within a work area;
    determining a designated axis of the designated area;
    aligning a series of generally parallel rows consistent with a travel axis having a known alignment with respect to the designated axis;
    defining one of the generally parallel rows as a starting row and pointing the vehicle in a starting direction along or generally parallel to the travel axis; and
    establishing a turn path segment after an end of the starting row to move the vehicle at a desired velocity associated with the turn path segment at least somewhat perpendicular to the travel axis between the starting row and a next row, a turn path segment having a turn radius greater than a minimum turning radius of the vehicle to increase at least one of a turn-entry velocity, a turn velocity and a turn-exit velocity of the vehicle with respect to that or those of the minimum turn radius consistent with the desired velocity, wherein the starting row and the next row are spatially separated by a multiple of effective implement widths, less an overlap allowance; and
    defining the turn path segment so as to skip one or more intervening parallel rows between the starting row and the next row.

2. The method according to claim 1 further comprising:
    establishing an additional turn path segment after an end of the next row to move the vehicle at least somewhat perpendicular to the travel axis between the next row and a subsequent next row, the additional turn path segment having a turn radius greater than or equal to a minimum turning radius of the vehicle; and
    defining the turn path segment so as to skip one or more intervening parallel rows between the next row and the subsequent next row.

3. The method according to claim 1 further comprising:
    skipping one or more intervening rows between each last row and each next successive row of the generally parallel rows for traversal by the vehicle as the vehicle progresses through the planned path from one end of the designated area to an opposite end, each said last row and each said successive row separated by one or more effective implement widths, less an overlap allowance.

4. The method according to claim 1 further comprising:
    bypassing one or more previously traversed intervening rows between a last row and a next successive row for traversal by the vehicle as the vehicle progresses through the planned path from one end of the designated area to an opposite end; and the last row and the next successive row separated by one or more effective implement widths, less an overlap allowance.

5. The method according to claim 1 further comprising:
    heading the vehicle in opposite directions for adjacent rows of the generally parallel rows, each of the generally parallel rows having an effective implement width and an offset from an adjacent row by an overlap allowance.

6. The method according to claim 1 wherein the overlap allowance between any two adjacent rows of the planned path is less than ten centimeters.

7. The method according to claim 1 further comprising:
    selecting a substantially minimum radius turn for at least one turn path segment in the planned path if the minimum radius turn substantially supports opposite travel directions for the vehicle for adjacent travel rows throughout the designated area to provide a desired coverage or traversal of the designated area.

8. The method according to claim 1 further comprising:
    selecting a bulb-shaped turn for at least one turn path segment in the planned path if the bulb-shaped turn substantially supports opposite travel directions for the vehicle for adjacent travel rows throughout the designated area to provide a desired coverage or traversal of the designated area.

9. The method according to claim 1 further comprising:
selecting a generally keyhole-shaped turn for at least one turn path segment in the planned path if the keyhole-shaped turn substantially supports opposite travel directions for the vehicle for adjacent travel rows throughout the designated area to provide a desired coverage or traversal of the designated area.

10. The method according to claim 1 further comprising:
determining a treatment of at least one of soil and vegetation within the designated area.

11. The method according to claim 10 wherein the determined treatment is mowing the vegetation within the designated area to a defined height.

12. The method according to claim 1 further comprising the step of:
activating an implement of the vehicle generally coincident with a border of the designated area upon movement of the vehicle toward an inside of the designated area from outside the designated area prior to or during alignment of a critical portion of the implement with the border; and
deactivating the implement of the vehicle coincident with the border of the designated area upon movement of the vehicle toward an outside of the designated area from an inside of the designated area prior to or during alignment of a critical portion of the implement with the border.

13. The method according to claim 12 further comprising:
defining the border in terms of a series of reference geographic coordinates; and
tracking the operational vehicular coordinates of the vehicle and direction of vehicular movement of the vehicle during operation of the vehicle for comparison to the reference geographic coordinates.

14. The method according to claim 12 wherein the implement is selected from the group consisting of a cutting blade, a mowing blade, a plow, a harrow, a cutter, a thresher, a mowing deck, a harvester, a pump, a sprayer, an agricultural implement, a construction implement, an agricultural attachment, and a construction attachment.

15. A system for determining a planned path for a vehicle, the system comprising:
data storage storing at least one of mapped area data, pattern parameters, and planned path data; the mapped area data defining a border of a designated area within a work area, the pattern parameters determining a designated axis of the designated area, the planned path data aligning a series of generally parallel rows consistent with a travel axis having a known alignment with respect to the designated axis;
a vehicular guidance module defining one of the generally parallel rows as a starting row and pointing the vehicle in a starting direction along or generally parallel to the travel axis;
a steering system for engaging in a turn path segment under control of the vehicular guidance module after an end of the starting row to move the vehicle at a desired velocity associated with the turn path segment at least somewhat perpendicular to the travel axis between the starting row and a next row, a turn path segment having a turn radius greater than a minimum turning radius of the vehicle to increase at least one of a turn-entry velocity, a turn velocity and a turn-exit velocity of the vehicle with respect to that or those of the minimum turn radius consistent with the desired velocity; the vehicular guidance module defining the turn path segment so as to skip one or more intervening parallel rows between the starting row and the next row, the starting row and the next row spatially separated by an effective implement width associated with the vehicle, less an overlap allowance.

16. The system according to claim 15 wherein the steering system is instructed to engage in an additional turn path segment after an end of the next row to move the vehicle at least somewhat perpendicular to the travel axis between the next row and a subsequent next row, the additional turn path segment having a turn radius greater than or equal to a minimum turning radius of the vehicle; the vehicular controller defining the turn path segment so as to skip one or more intervening parallel rows between the next row and the subsequent next row; the next row and the next subsequent row spatially separated by an effective implement width associated with the vehicle, less an overlap allowance.

17. The system according to claim 15 wherein the vehicular guidance module controls the vehicle to skip one or more intervening rows between each last row and each next successive row of the generally parallel rows for traversal by the vehicle as the vehicle progresses through the planned path from one end of the designated area to an opposite end.

18. The system according to claim 15 wherein the vehicular guidance module controls the vehicle to bypass one or more previously traversed intervening rows between each last row end each next successive row for traversal by the vehicle as the vehicle progresses through the planned path from one end of the designated area to an opposite end.

19. The system according to claim 15 wherein the vehicular guidance module controls the vehicle to head in opposite directions for traversal of adjacent rows of the generally parallel rows; the vehicular guidance module controlling the vehicle to overlap between two adjacent rows by the overlap allowance.

20. The system according to claim 19 wherein the overlap allowance between any two rows is generally less than ten centimeters.

21. The system according to claim 15 further comprising:
a path planner for selecting a substantially minimum radius turn for at least one turn path segment in the planned path if the minimum radius turn substantially supports opposite travel directions for the vehicle for adjacent travel rows throughout the designated area to traverse a desired portion of the designated area.

22. The system according to claim 15 further comprising:
a path planner for selecting a bulb-shaped turn for at least one turn path segment in the planned path if the bulb-shaped turn substantially supports opposite travel directions for the vehicle for adjacent travel rows throughout the designated area to traverse a desired portion of the designated area.

23. The system according to claim 15 further comprising:
a path planner for selecting a generally keyhole-shaped turn for at least one turn path segment in the planned path if the keyhole-shaped turn substantially supports opposite travel directions for the vehicle for adjacent travel rows throughout the designated area to traverse a desired portion of the designated area.

24. The system according to claim 15 further comprising:
a vehicular controller for determining a treatment of at least one of vegetation and soil within the designated area.

25. The system according to claim 24 wherein the determined treatment is mowing the vegetation within the designated area.

26. The system according to claim 15 further comprising the step of:

activating an implement system of the vehicle generally coincident with the border of the designated area prior to or during movement of the vehicle toward an inside the designated area; and deactivating the implement system of the vehicle coincident with the border prior to or upon movement of the vehicle toward an outside of the designated area.

27. The system according to claim 26 further comprising:

defining the border in terms of a series of reference geographic coordinates; and tracking the operational vehicular coordinates of the vehicle and direction of vehicular movement of the vehicle during operation of the vehicle for comparison to the reference geographic coordinates.

28. The system according to claim 26 wherein the implement system is selected from the group consisting of a cutting blade, a mowing blade, a plow, a disc harrow, a cutter, a thresher, a mowing deck, a harvester, a pump, a sprayer, an agricultural implement, an agricultural attachment, a construction implement and a construction attachment.

* * * * *